Jan. 30, 1951 S. TOMBERG 2,539,495
ANTENNA OUTPUT INDICATOR
Filed June 12, 1944 2 Sheets-Sheet 1

INVENTOR.
SIDNEY TOMBERG
BY William D. Hall
ATTORNEY

Jan. 30, 1951 S. TOMBERG 2,539,495
ANTENNA OUTPUT INDICATOR
Filed June 12, 1944 2 Sheets-Sheet 2

INVENTOR.
SIDNEY TOMBERG
BY William D. Hall.
ATTORNEY

Patented Jan. 30, 1951

2,539,495

UNITED STATES PATENT OFFICE 2,539,495

ANTENNA OUTPUT INDICATOR

Sidney Tomberg, Camden, N. J., assignor to the United States of America as represented by the Secretary of War Application June 12, 1944, Serial No. 539,949

3 Claims. (Cl. 315—34)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio testing devices and more particularly to an improved dipole antenna output indicator.

In the past, available dipole antenna output indicators have comprised a receiving dipole with an indicating device such as a small light bulb or the like, interposed between the poles thereof and having a filament observable through a slot in an enclosing hood. Radio energy of sufficient strength from a sending dipole, incited luminosity of increasing intensity in the filament of the light bulb as the receiving dipole was brought increasingly near the sending dipole. The intensity of the filament luminosity is increased with increase in strength of the energy given off by the sending dipole and passing through the light filament. This older type of device is not sufficiently sensitive for testing sending antennas attached to low power equipment. This objection is of importance particularly in the testing of altimeter equipment where the power output is low and where the installations require transmission lines of considerable length.

The objects of the present invention include the provision of an improved radio output indicator that successfully overcomes the sensitivity and range limitations that have characterized similar radio output indicators that have been available heretofore; another object is to provide a radio output indicator having an adjustably continuous observable sensitivity throughout the blind range of previously available devices for detecting electrical impulses of small magnitude; a further object is to provide a radio output indicator that is successfully operable even when bright sunlight is falling upon the device; another object is to provide an easily and inexpensively assembled and serviced compact and readily portable radio output indicator that is highly sensitive and dependable, that consists very largely of conventionally readily available and dependable parts, a device that is simply operated and that is sufficiently rugged to provide a long and demanding service life; another object is to permit testing of the lamp in the indicator to determine whether it is operable before testing and sending antenna; and another object is to permit the use of less sensitive and therefore more rugged indicator lamps.

With the above and other objects in view, which will be apparent from the following description to those who are informed concerning the use of and the characteristics and limitations of available devices for testing the radio output of sending antennas and the like, an illustrative embodiment of the present invention is shown in the accompanying drawings wherein.

Figures 1, 2:
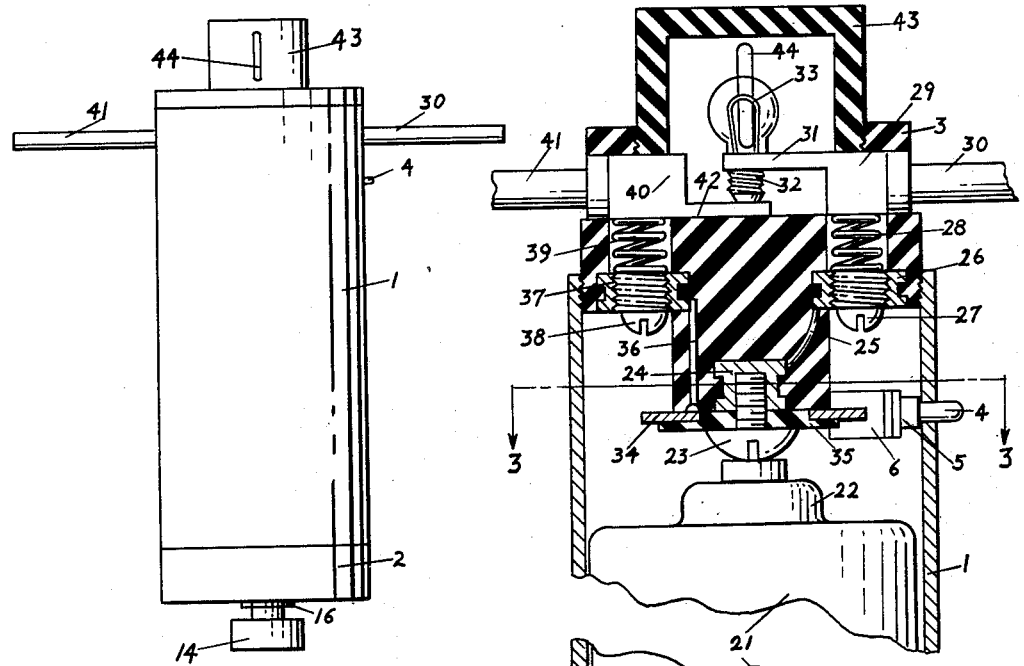
Fig. 1 is a side elevation of a device that embodies the present invention.
Fig. 2 is a foreshortened enlarged longitudinal section of the device that is shown in Fig. 1.
Figure 3:
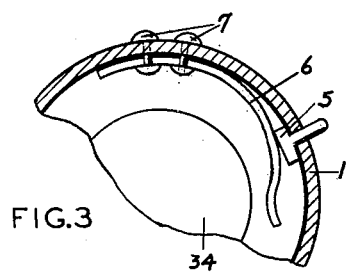
Fig. 3 is a fragmentary section taken along the line of 3—3 of Fig. 2.

The illustrated dipole antenna output indicator comprises a shell 1 that preferably makes threaded engagement at one end with a plug or cap 2 and at its opposite end with an insulating mount 3. Any suitable device operating switch is made readily available, as for example, the assembly of a push button 4 that is disposed within and that extends through an aperture in the shell 1. The push button 4 has an expanded base 5 for preventing the disengagement of the button 4 from the shell 1 and for engaging an unattached end of a spring contact 6 that is made of spring brass or the like. The contact 6 preferably extends substantially concentrically with the curvature of the shell 1 and has its attached end secured to the shell 1 in any desired manner as by means of rivets 7 or the like.

The cap 2 has a suitable form of rheostat mounted therein, comprising a metallic case 8 containing resistance wire 9 that is wound upon an insulation core 10 and that has one end attached to a terminal 11. The wire 9 is insulated from the case 8 by an insulating material 51 that is interposed therebetween. A spring contact 12 makes wiping contact in any desired manner with the wire 9 and is mounted rotatably substantially centrally of the core 10. The spring contact 12 is carried by a pin 13 that continues through the base of the cap 2 and carries on its free end a rheostat adjusting externally milled finger knob 14, or the like. The pin 13 is flared at 15 to engage the bottom wall of the case 8 outwardly of an aperture therein that accommodates a threaded part of the pin 13 that is disposed between the flared part 15 and the knob 14. A nut 16 engages the threaded part of the pin 13 and secures the rheostat assembly within the cap 2. The threaded part of the pin 13 may contain a spring clutch commonly found as a commercial part of this member, if desired.

A wire 17 connects the terminal 11 with a rivet 18 as by being soldered thereto. The rivet 18 mounts a spring 19 substantially centrally of an insulating washer 20. The washer 20 is supported upon an edge of the cap 2, or otherwise as preferred, so that the spring 19 makes electrical contact with the zinc bottom of a battery 21 that is disposed within the bore of the shell 1. The spring 19 yieldingly maintains electrical contact between a carbon post 22 at the upper end of the battery 21 and a contact screw 23 that threads into a contact receiving insert 24 that is embedded within the lower end of the mount 3. The contact receiving insert 24 is connected electrically, as by a wire 25 with a choke supporting insert 26 that also is molded into the mount 3. A screw 27 threads into the choke supporting insert 26 and supports a choke coil 28 against an antenna base 29. The antenna base 29 preferably is threaded internally so that an antenna 30 of a desired length may be removably mounted therein. An extension 31 from the antenna base 29 has its unattached end threaded internally for the removable mounting therein of, and for making electrical connection with, the outer contact of the base of a small lamp 32 having a filament 33 therein.

The contact screw 23 also clamps a ring contact 34 against a shoulder on the lower end of the mount 3, as by means of an insulating washer 35 that is interposed between the ring contact 34 and the head of the contact screw 23. A wire 36 connects the ring contact 34 with a choke supporting insert 37 that is molded into the mount 3, as by having its respective ends welded, soldered or otherwise secured thereto. The choke supporting insert 37 is threaded internally for the reception of a screw 38 that supports a choke coil 39. The choke coil 39 bears upwardly against an antenna base 40 that is threaded internally for the mounting therein of a threaded end of an antenna 41 of a length that is equal to that of the antenna 30. An extension 42 from the antenna base 40 makes connection with the center contact in the base of the lamp 32. A hood or cap 43 is removably mounted in any desired manner upon the antenna bearing end of the mount 3, as by making threaded engagement therewith as shown, or the like. Suitable means, such as a pair of narrow slits 44 or the like, permit observation of the filament 33 within the lamp 32.

Figure 5:
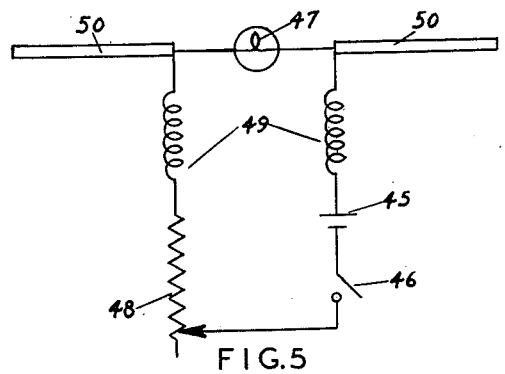
Fig. 5 is a wiring diagram of the device that is shown in Fig. 1.
Figure 4:
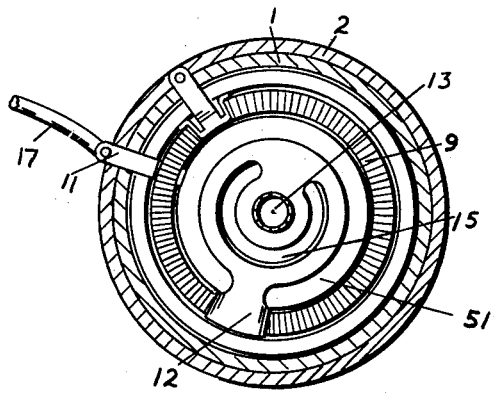
Fig. 4 is a section taken along the line 4—4 of Fig. 2.

A circuit for the device is shown in Fig. 5 of the accompanying drawings wherein a battery 45 has a switch 46 on its negative side. A lamp filament 47, a variable resistance 48 and a pair of chokes 49 are in series in the circuit. Each of a pair of dipole antennas 50 is disposed upon opposite sides of the lamp filament 47 and between the lamp filament 47 and the chokes 49.

The theory of operation can best be explained by referring to Fig. 5 in the accompanying drawings. When the indicator is held in the vicinity of a sending antenna, a portion of the energy given off by the sending antenna will be absorbed by the indicator. The absorbed energy will then be dissipated in the filament 47 as heat. Since it has been assumed that this absorbed energy is not sufficient to cause the filament to incandesce, due to the low power of the sending antenna, no indication will appear. This is the case with former indicators. By depressing switch 4 or 46 in the proposed circuit, however, and adjusting the knob on the rheostat 48 until the threshold of luminosity is reached, the energy necessary to bring the temperature of the filament 33 or 47 to the threshold is supplied by the battery 21 or 45. The additional radio energy absorbed by the indicator from the sending antenna will be sufficient to cause incandescence in the light filament and an indication showing the presence of a radio field will be observed. The purpose of the choke coils is to permit the received radio energy to pass through the lamp filament and not through the battery-rheostat circuit, and also to permit current from the battery to pass through the lamp filament. The switch is to prevent continuous battery drain when the device is not in use.

In test use, the device serves the purpose of determining whether radio energy is being given off by a sending dipole antenna that is presumably in operation.

Before the sending apparatus, as shown in Fig. 2 of the drawings, is started in operation, the switch button 4 is depressed causing its base 5 to press the spring contact 6 into engagement with the ring contact 34. The rheostat is then adjusted by the rotation of the knob 14 until the lamp filament 33 is just at the threshold of luminosity as viewed through one of the slits 44 in the hood or cap 43. The device is then ready for use.

The sending antennas are then energized. The receiving antennas 30 and 41 are then caused to approach the sending antennas from positions that are substantially parallel thereto. The presence of luminosity in the filament 33 indicates the reception by the receiving antennas.

Testing outdoors in the presence of bright sunlight is sometimes necessary. In using the present device, when the filament 33 is brought to the threshold of luminosity in the presence of bright sunlight and the threshold having been raised by the presence of the sunlight, more energy from the battery circuit is required so its sensitivity to radio energy is not altered by the continued presence of the sunlight.

In experimental tests, great increase in sensitivity was obtained with an experimental model that embodied the present invention as compared with corresponding devices that were not equipped with the battery circuit that forms a part of the present device. At approximately two inches from the sending dipole antenna the light filament of the commercial device crossed the threshold of luminosity or became inactive. With the same power output of the sending set, the experimental device that embodied the present invention operated with its antennas up to 15 inches from the antennas of the sending set. Under the same conditions, therefore, since the ratio of energy required to operate these devices is in the ratio of the squares of the distances separating the sending antennas from the receiving antennas, when the antennas are maintained parallel with respect to each other, the experimental relative sensitivity is as 15 squared is to 2 squared or the experimental device that is embodied in the present invention had a sensitivity upwardly of 56 times that of the commercial device with which it was compared.

It is to be understood that the antenna output indicator that has been disclosed and described herein, and the parts thereof, have been submitted for the purposes of illustrating and explaining the present invention and that various modifications in the device and the replacement of the particular types of the parts thereof and their chosen assembly may be made for other uses and other adaptations without departing from the present invention as defined by the appended claims.

What I claim is:

1. An antenna output indicator, comprising in combination a lamp, said lamp having two terminals, a filament in said lamp and adapted to luminesce, a current source in circuit with said lamp filament for conducting energizing current thereto, two terminals of said current source being applied to the two terminals of said lamp, means interposed between said lamp terminals and said current source terminals for adjusting the current flow therebetween, an antenna connected with one of said lamp terminals, and another antenna connected with the other of said lamp terminals and insulated from said first mentioned antenna, said first and second antennas being adapted for receiving radio energy and applying the received radio energy to said filament to increase the luminescence thereof.

2. An antenna output indicator, comprising in combination a lamp, said lamp having two terminals, a filament in said lamp and adapted to luminesce, a current source in circuit with said lamp filament for conducting energizing current thereto, two terminals of said current source being applied to the two terminals of said lamp, means interposed between said lamp terminals and said current source terminals for adjusting the current flow therebetween, an antenna connected with one of said lamp terminals, another antenna connected with the other of said lamp terminals and insulated from said first mentioned antenna, said first and second antennas being adapted for receiving radio energy and applying the received radio energy to said filament to increase the luminescence thereof, and means also in circuit with said source for releasably applying said current source to said filament.

3. An antenna output indicator comprising in combination a shell, a cap removably mountable on an end of said shell, a mount on the opposite end of said shell, a battery within said shell and removable therefrom on the removal of said cap, an adjustable rheostat within said cap, positive and negative pole parts of said battery, a pair of dipole antennas carried by said mount and insulated from each other, a first choke coil connected between the positive pole of said battery and one of said dipole antennas, a second choke coil means connecting said second choke coil and said rheostat in series between the negative pole of said battery and the other of said dipole antennas, a filamentary light bulb having two filament terminals, one of its contacts connected electrically to one of said antennas and the other of said contacts connected electrically to the other of said dipole antennas, and a switch releasably connecting the poles of said battery with said light bulb contacts through said coils.

SIDNEY TOMBERG.

REFERENCES CITED

The following references are of record in the file of this patent:

UNITED STATES PATENTS

| Number | Name | Date |
| --- | --- | --- |
| 2,128,750 | Kriebel | Aug. 30, 1938 |
| 2,153,181 | Gerhard et al. | Apr. 4, 1939 |
| 2,166,124 | Breyer | July 18, 1939 |
| 2,197,494 | Erben | Apr. 16, 1940 |